Dec. 29, 1953          J. H. REILLY          2,664,373
METHOD OF LINING RIGID PIPE WITH ELASTIC THERMOPLASTICS
Filed Oct. 25, 1950
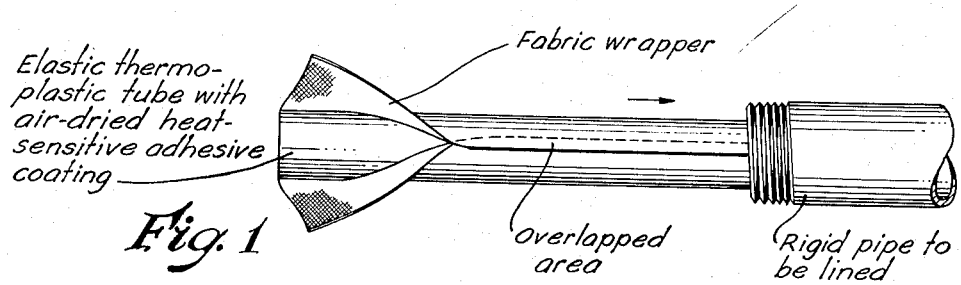
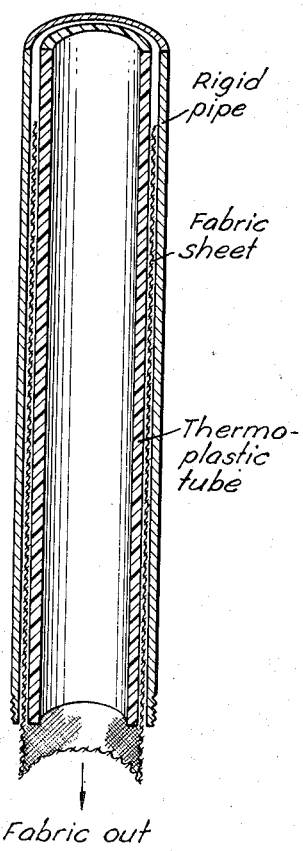
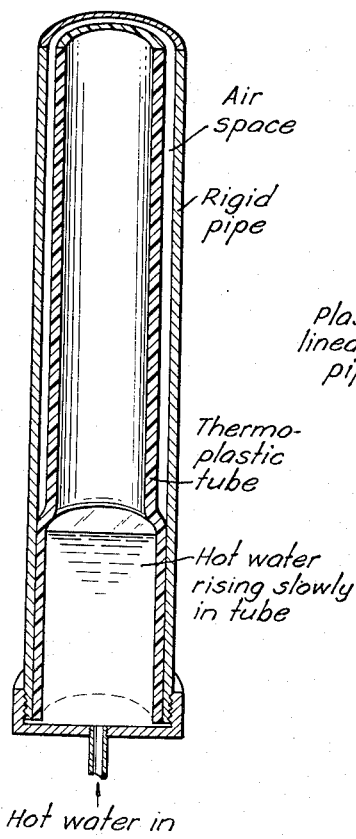
INVENTOR
John H. Reilly
BY
Griswold & Burdick
ATTORNEYS Patented Dec. 29, 1953

2,664,373

UNITED STATES PATENT OFFICE 2,664,373

METHOD OF LINING RIGID PIPE WITH ELASTIC THERMOPLASTICS

John H. Reilly, Midland, Mich., assignor to The Dow Chemical Company, Midland, Mich., a corporation of Delaware Application October 25, 1950, Serial No. 192,139

3 Claims. (Cl. 154—82)

This invention relates to a method of lining rigid pipe with elastic thermoplastic material. It is concerned primarily with a method for lining metal pipe with such material.

There are many types of fluids which are so corrosive or so abrasive that they cannot be handled satisfactorily in metal or ceramic pipes. To overcome this difficulty, metal and other rigid pipes have been lined with rubber or with various plastic materials which are resistant to attack by the fluids which it is desired to convey through the pipes. The organic liner protects the pipe and the pipe gives rigidity to the liner.

Many of the methods employed for making lined pipe of the suggested type require special and expensive equipment, and can only be carried out successfully in pipe factories or in special shops which may be distant from the point of use of the finished product.

It is an object of this invention to provide a method for lining rigid pipe with elastic thermoplastic material. A particular object is to provide such a method which requires only the simplest equipment and is adapted to be carried out successfully wherever the pipe is to be used, if desired.

The method of the present invention comprises providing a tube of elastic thermoplastic material, having an outside diameter slightly (5 to 15 per cent) less than the internal diameter of the rigid pipe to be lined, coating at least one and preferably both the external surface of the plastic tube and the internal surface of the rigid pipe with an initially thermoplastic and preferably a vulcanizable adhesive which is non-tacky to the touch when air-dry, allowing the adhesive to dry to the non-tacky condition, wrapping the plastic tube with a fabric sheet disposed about the tube so that the lateral edges of the sheet overlap longitudinally of the tube, inserting the so-wrapped tube in the rigid pipe, withdrawing the fabric sheet, positioning the assembly with one end higher than the other, filling the tube gradually from its lower end with water at a temperature sufficient to render the tube plastic and flowable, thereby distending it to fit the pipe without intervening air bubbles, and thermally activating the adhesive, and, when the outside of the assembly has become warm to the touch, draining the hot water from the tube. In the case of vulcanizable elastic plastics, the so-lined pipe may then be placed in a bath of hot water containing some dissolved ammonia or other curing agent, and kept hot until the liner is vulcanized.

The particular composition of the liner does not form part of the present invention. It must be made of an elastic plastic material, capable of some small but significant amount of distention under a slight positive pressure at the temperatures which can be attained with hot water. Many such materials are known. One such is unvulcanized rubber. Another group includes the unvulcanized synthetic rubbers of the butadiene-styrene, butadiene-acrylonitrile, and the isobutylene families of polymers. Other materials having the required properties include the copolymer of 85 to 92 per cent vinylidene chloride with a complementary amount, 15 to 8 per cent, of acrylonitrile. Numerous other elastic plastics are widely known. It is preferred that the plastic composition, of which the liner is made, contains fillers, vulcanizing agents, accelerators, and the like, so that the liner may be cured and made relatively non-plastic after it has been caused to expand in and adhere to the rigid pipe.

The adhesive employed to coat the inside of the rigid pipe, or the outside of the plastic liner, or both, is also outside the scope of the present invention. Numerous adhesives are known which will serve the desired purpose. The one chosen for use should be capable of air-drying, after application, to a condition which is non-tacky to the touch, yet it should be capable of becoming activated by heat (a so-called "heat sensitive" adhesive) to bond the liner to the rigid pipe. The adhesive should preferably be one which is itself vulcanized or cured by the prolonged application of heat. Thus, rubber cements, synthetic rubber cements, and various vinyl polymer adhesives may be used. One adhesive which has been found especially useful is that described in U. S. Patent No. 2,523,235, issued September 19, 1950 on my application Serial No. 87,341 filed April 13, 1949. That adhesive comprises 4 to 8 parts of a tetraalkyl thiuram disulfide for each 100 parts of a binary copolymer of from 85 to 92 per cent vinylidene chloride and 15 to 8 per cent acrylonitrile.

The elastic plastic tube to be used as the liner should be enough smaller than the rigid pipe to be lined so that it may be inserted therein, but not so much smaller that it will be ruptured by the amount of distention necessary to expand it to fit the rigid pipe. Regardless of the actual size of the pipe to be lined, a useful working relationship between the size of the pipe and of its liner is found when the circumference of the inside of the pipe exceeds that of the outside of the liner by about 1 inch per circumferential foot. More broadly, a difference of from 5 to 15 per cent in diameters of the two members is desired. When the adhesive has been applied to one or both of the surfaces to be joined, and it has dried to a non-tacky condition, it is found that it is almost impossible to insert the liner in the pipe because the adhesive, in its air-dried form, exerts too great a frictional drag on contiguous surfaces to permit the liner to move into its proper longitudinal position relative to the rigid pipe. It has also been found that this problem may be overcome by interposing a layer of cloth between the liner and the pipe while the former is being inserted in the latter. The cloth may be linen or cotton, and need not be of a close weave, it being sufficient that the fabric employed keep the adhesive-coated surfaces out of contact with the parallel surface of the other member of the assembly. Muslin, cambric, percale, lawn, and cheese cloth are examples of suitable fabrics. In most cases it is necessary to remove the fabric before the liner can be caused to adhere to the pipe. Hence, it is necessary that the cloth be disposed about the liner with parallel edges of the cloth overlapping longitudinally of the liner, rather than helically thereabout. When the liner has been so-wrapped, no material frictional drag is encountered when it is slid into the rigid pipe. The liner may then be held in place while the fabric is simply withdrawn from one end of the pipe, and the fabric may be used again.

One end of the resulting loosely lined pipe is elevated above the level on which the other end rests, and hot water is pumped into the liner slowly, from its lower end, at a rate of about 5 feet per minute and at a temperature sufficient to soften the liner to a plastic and distensible condition. To provide the necessary amount of heat, the body of water in a small pipe must be at a higher temperature than would be necessary in the larger body of water in a large pipe. Suitable temperatures are commonly in the range of 50° to 90° C. As the water gradually fills the liner, the latter expands, even under the slight head of water, and is pressed against the pipe. Enough heat is conducted through the liner from the water to activate the adhesive, and the liner becomes bonded to the pipe. After the hot water has risen to the top of the liner, and the latter has expanded against the pipe, expressing any air from the original space between the pipe and liner, the water is left in the assembly at least until the upper end of the rigid pipe has become warm to the touch, and preferably until its temperature has reached about 50° C. The water may then be drained out, and the liner may be trimmed to remove protruding ends, or to flare it out over terminal flanges on the rigid pipe, as desired. The unitary article may then be heated further to vulcanize the liner and adhesive, in those cases in which vulcanizable compositions have been used. Such heating may be accomplished conveniently by immersing the assembly for 24 to 48 hours in hot water which may contain a little ammonia or other curing agent for the liner composition.

The invention is illustrated in the accompanying drawing, wherein

Fig. 1 illustrates the fabric wrapped, adhesively coated thermoplastic liner being inserted in a rigid pipe;

Fig. 2 shows, in isometric cross-section, the resulting assembly in vertical position, with the fabric being withdrawn;

Fig. 3 is a similar sectional view, showing hot water being fed slowly into the assembly from the bottom, expanding the liner against the pipe and displacing air from the space between the pipe and liner; and, Fig. 4 is a similar sectional view of the finished article.

The following example illustrates the practice of the present invention:

It was desired to line a standard steel pipe (schedule 40), of nominal 8 inch size. This pipe had an inside diameter of 7.98 inches, or an inside circumference of 25.1 inches. There was prepared by extrusion a plastic tube to be used as a liner, having an outside diameter of 7.33 inches, or an outside circumference of 23 inches. The plastic composition from which the liner was made was:

| | Parts by weight |
|---|---|
| Copolymer of 85 per cent vinylidene chloride and 15 per cent acrylonitrile | 100 |
| Carbon black ("Thermax") | 40 |
| Dibutyl phthalate | 40 |
| Lead oxide | 4 |
| Stearic acid | 1 |
| Aniline-butyraldehyde curing agent ("Beutene") | 1.5 |

This elastic vulcanizable composition begins to soften and flow at about 60° C., prior to vulcanization. Both the inside surface of the steel pipe and the outside surface of the liner were given a prime coat of an adhesive composition consisting of:

| | Parts by weight |
|---|---|
| Phenol-resorcinol-formaldehyde resin | 2.5 |
| Butadiene-acrylonitrile synthetic rubber | 1 |
| Paraformaldehyde | 1 | dissolved to form a 20 to 25 per cent solution in an equal volume mixture of acetone and methyl isobutyl ketone. When the solvent had evaporated from the prime coats, a "step-off" adhesive was applied to the same two surfaces. This consisted of a 20 to 25 per cent solution in the same solvents of

| | Parts by weight |
|---|---|
| Copolymer of 85 per cent vinylidene chloride and 15 per cent acrylonitrile | 100 |
| Carbon black ("Thermax") | 30 |
| Magnesium oxide | 20 |
| Plasticizer | 30 |
| Lead oxide | 4 |
| Tetraethyl thiuram disulfide | 6 |
| Diisopropanol ethanolamine (or other amine) | 1.5 |

When the adhesive coatings had dried until they were non-tacky at room temperature, the liner could not be slid into the pipe because of frictional drag. When a strip of muslin, 30 inches wide, was wrapped about the liner, with its lateral edges overlapped about 3.5 inches longitudinally of the liner, parallel to its axis, the wrapped liner was slid inside the pipe without difficulty. The liner was held in place and the cloth was pulled out. The pipe assembly was raised to a vertical position, and water at 75° C. was pumped into the bottom of the liner at a rate to rise in the pipe about 5 feet per minute. The liner was thereby softened and expanded to fit the pipe, and the heat-sensitive adhesive was activated. After the pipe was full of hot water, the latter was kept in the pipe until the outer steel pipe reached a temperature of 50° C. at its upper end. The water was drained out, and the softened extensions of the liner were flared out over terminal flanges on the pipe. The unitary article was then placed in a trough of hot water at 60° C., to which had been added one volume of 27 per cent ammonium hydroxide for each 100 volumes of water. The 60° temperature was maintained for about 40 hours, by which time the liner was cured to a non-thermoplastic condition. The resulting lined pipe was employed in chemical process equipment.

While the temperature effect is probably of greater importance than that of pressure in expanding the elastic plastic liner in the surrounding rigid pipe, it is sometimes convenient to put an extension on the rigid pipe, and to fill both the pipe and its extension with hot water, so that a small but significant hydrostatic head is available to act on the liner. Once the liner has been expanded into its final position against the rigid pipe, it may be desirable, especially with the smaller pipe sizes, to put the hot water into circulation so that more heat is made available to activate the adhesive layers.

The described method is applicable to the lining of rigid pipes with any elastic thermoplastic material, including the various synthetic rubbers. The various such materials have different softening points, and it may not always be possible to bring the liner to a temperature at which it is readily deformable using water as the heating liquid. Instead, other liquids which are inert to the liner may be used, such as strong salt brines, or the glycols, which have higher boiling points than water.

I claim:

1. The method of lining rigid pipe which comprises providing a tube of elastic thermoplastic material having an outside diameter about 5 to 15 per cent less than the inside diameter of the pipe to be lined, coating at least one of the intended contacting surfaces of the rigid pipe and plastic liner with a solution of an initially thermoplastic adhesive, drying the adhesive to a non-tacky condition, wrapping the plastic tube with a fabric sheet disposed with its lateral edges overlapped longitudinally of the tube, inserting the so-wrapped tube in the rigid pipe, withdrawing the fabric sheet, raising one end of the resulting assembly higher than the other, filling the tube gradually from its lower end with a hot liquid which is inert to the plastic tube, at a temperature sufficient to render the tube plastic and flowable, thereby distending the tube to fit the pipe progressively from its lower end, and activating the adhesive, and, after the upper outside end of the pipe has become at least warm to the touch, draining the hot liquid from the lined pipe.

2. The method as claimed in claim 1, wherein the heat-sensitive adhesive is applied to both the outside of the plastic tube and the inside of the rigid pipe.

3. The method as claimed in claim 1, wherein the inert liquid is water, and the elastic thermoplastic material becomes flowable at a temperature below the boiling point of water.

JOHN H. REILLY.

References Cited in the file of this patent

UNITED STATES PATENTS

| Number | Name | Date |
|---|---|---|
| 417,688 | Tatham | Dec. 17, 1889 |
| 642,539 | Thoma | Jan. 30, 1900 |
| 1,367,231 | Boyer | Feb. 1, 1921 |
| 1,772,190 | Merrill | Aug. 5, 1930 |
| 2,149,991 | Dodge | Mar. 7, 1939 |
| 2,312,993 | Stephens | Mar. 2, 1943 |